United States Patent [19]
Gebauer

[11] 3,818,740
[45] June 25, 1974

[54] METHOD AND APPARATUS FOR PRODUCING WELDED SPIRAL SEAM PIPE

[75] Inventor: Hans Gebauer, Herns, Germany

[73] Assignee: Hoesch Maschinenfabrik Deutschland AG, Dortmund, Germany

[22] Filed: Dec. 6, 1972

[21] Appl. No.: 312,729

[30] Foreign Application Priority Data
Dec. 9, 1971 Germany............................ 2161105

[52] U.S. Cl..................... 72/203, 266/23 K, 29/482
[51] Int. Cl............................ B21b 1/00, B23k 1/20
[58] Field of Search............ 72/203, 366; 266/23 K, 266/23 R; 29/482

[56] References Cited
UNITED STATES PATENTS

| | | |
|---|---|---|
| 3,422,656 | 1/1969 | Orr et al. ........................... 72/199 X |
| 3,610,863 | 10/1971 | Doublet .............................. 29/487 |

Primary Examiner—Milton S. Mehr
Attorney, Agent, or Firm—Toren, McGeady and Stanger

[57] ABSTRACT

In shaping the lateral edges of an elongated flat section, such as a metal or plastic strip or plate, whether with or without a cover layer or coating, preparatory to welding them in a pipe molding mill for forming spiral seam pipings, the edges are machined, for example, with a cutting torch, to provide a pair of bevels on each edge. The beveled portions of the lateral edges intersect in an outwardly projecting apex spaced from each of the surfaces defining the opposite faces of the section. On the opposite lateral edges the apices are offset relative to one another so that an overlapped arrangement is provided when the opposite edges are positioned for the spiral seam welding operation.

17 Claims, 8 Drawing Figures

METHOD AND APPARATUS FOR PRODUCING WELDED SPIRAL SEAM PIPE

SUMMARY OF THE INVENTION

The present invention concerns a method of and apparatus for the production of welded spiral seam piping and, more particularly, it is directed to the machining of the lateral edges of the strip or plate used in forming the piping. The strip or plate can be either metal or plastic with or without a cover layer or coating.

In plants used for the production of spiral seam piping formed of metal strips, the lateral edges of the continuously moving metal strip are trimmed with stationary roller shears and planing tools or milling devices so that the metal strip can be fed at a constant width into the pipe molding machine.

In the trimming operation, by shaping the lateral edges of the strip to provide a certain profile, the welding of the edges is also taken into account.

Unfortunately, the known devices for trimming the lateral edges of strip material in spiral seam pipe mills work satisfactorily only with slowly moving metal strip.

As a solution to the problem, it has been suggested that the lateral edges of the metal strip be trimmed on a planing machine at a location remote from the pipe molding machine. Such a solution is disadvantageous because of the great capital expenditure involved.

Accordingly, it is the primary object of the prevent invention to provide a method of and apparatus for producing welded spiral seam piping which can be used under all circumstances. The invention is applicable to the formation of the piping from both metal and plastic strip plate whether or not it is formed with a cover layer or plating. In preparing the strip or plate for the welding operation, the lateral edges are chamfered or beveled at any thickness and velocity of travel of the strip and, following the shaping, the lateral edges can be brought to a proper temperature which is favorable for the welding operation in the formation of the spiral seam piping.

Therefore, in accordance with the present invention, the lateral edges of the continuously moving section from which the piping is formed are trimmed or machined in multiple intermittent operations effected in the direction of feed of the section and, after the lateral edges have been properly profiled, they are brought to a temperature suitable for carrying out the welding operation.

In shaping the lateral edges of the section, the machining operation can be carried out by flame-cutting, milling or planing. When the spiral seam piping is formed by the arc welding method, the lateral edges of the section forming the piping is provided with a pair of beveled surfaces intersecting in an apex projecting outwardly from the lateral edge.

In machining the lateral edges, both of the beveled surfaces are formed from the top surface of the strip or plate section.

To facilitate the welding of the lateral edges, the lengths of the bevels on each lateral edge are unequal and are arranged so that the apices on the opposite lateral edges are offset relative to one another.

The scarfing angles used in forming the beveled surfaces on the lateral edges are approximately equal on both of the edges.

After the machining operation, the lateral edges of the section are planished or smoothed.

Following the machining operation and prior to the welding of the lateral edges, they are heated or cooled to the desired temperature for welding with a gaseous medium.

In a preferred embodiment, the machining operation is carried out by a device equipped with at least two cutting torches which are arranged to move intermittently in the direction of the feed of the strip or plate section along each of the lateral edges. Before the section is admitted into the pipe molding mill and after passing downstream from the cutting torches, each of the lateral edges is passed through a planishing mill and then through a heat transfer unit with a feeler gauge arranged before and behind the heat transfer unit. A pair of driver rolls are located upstream of the cutting torches for feeding the section toward the pipe-molding machine.

The machining device includes a base member mounting at least one movable support carrying the cutting torches, which support is capable of effecting movement longitudinally, transversely and perpendicularly relative to the section from which the piping is formed.

At least one bar is rotatably mounted on a top slide of the support for positioning the cutting torches at the proper angle for machining the beveled surfaces on the lateral edges of the section.

A motor is secured on the top slide of the support and produces the desired rotary movement of the bar.

Further, three motors are associated with the movable support for effecting the longitudinal, transverse and perpendicular movements relative to the strip or plate section.

Preferably, the cutting torches are electron beam or plasma torches.

The planishing mill for smoothing the beveled surfaces on the lateral edges includes a planishing roll mounted on a ram arranged to position the roll transversely of the direction of movement of the piping section.

As the piping section is fed from the heat transfer units to the welding positions in the pipe molding machine, the lateral edges are covered with insulation.

A switching device is operatively associated with each of the motors which effect the movement of the machining members for carrying out the proper intermittent operation of the machining steps.

Further, the feeler gauges are also tied into the switching device for controlling the heat transfer units.

In another embodiment, in place of the cutting torches, at least two milling units are mounted on the top slide of the support for trimming each of the lateral edges of the piping section.

One of the primary advantages of the present invention is that the lateral edges of the section can be machined at a rate adapted to the trimming operation, independent of the feed velocity of the section. Additionally, the lateral edges of the section can be trimmed at different velocities.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
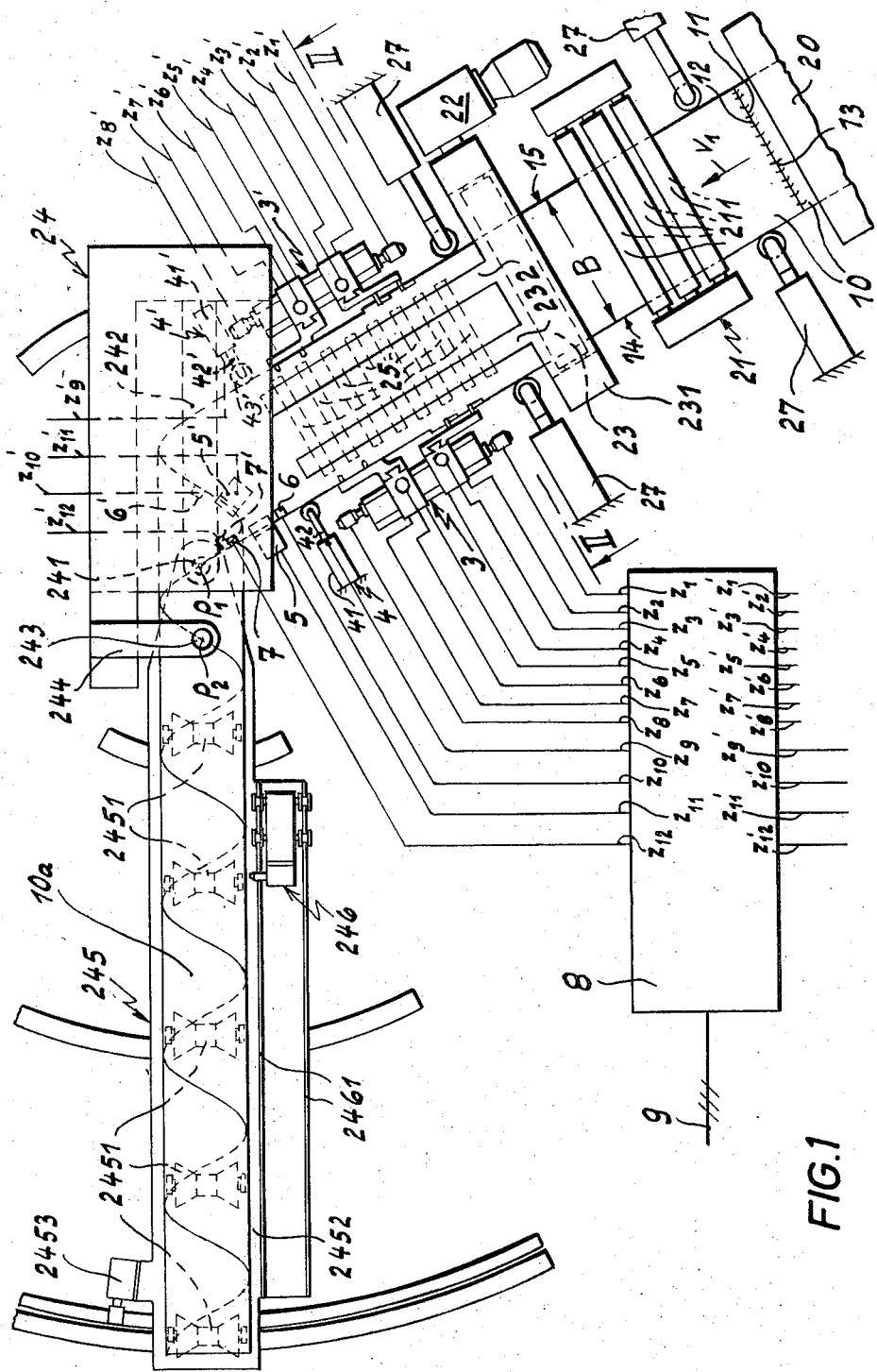
FIG. 1 is a top view of a plant for the production of welded spiral seam piping from a strip or plate section.

As illustrated in FIG. 1, a section 10 formed of a strip or plate having a width B and a thickness s is passed through a welding stand 20 in which the leading end 11 of one plate and the trailing end 12 of another plate are joined together by an arc-welded seam 13. From the welding stand, the section 10 passes at a constant velocity feed $v_1$ through a roller leveller 21 whose rollers 211 are not driven. The continuous feed velocity $v_1$ is provided by a pair of driver rolls 23 driven by a geared engine 22. To prevent buckling of the section 10 between the pair of driver rolls 23 and a pipe molding machine 24 which includes a three-roll bending system and several holding rolls, eight supporting rollers 25 are positioned below the section 10 and a number of supporting rollers 26 are located above the section 10. The lower supporting rollers 25 are rotatably mounted in bearing blocks 251, while the upper supporting rollers 26 are rotatably mounted in fork-shaped members 261, each of which is dependently supported from a carrier 232 positioned on a driver roll stand 231.

Laterally, the section 10, moving at a continuous feed velocity $v_1$, is held by two pair of supporting members 27, one located between the welding stand 20 and the roller leveler 21 and the other pair positioned immediately downstream from the driver roll stand 231. Between the driver rolls 23 and the pipe molding machine 24 and downstream from the pair of supporting members 27 located next to the driver rolls, a machining device 3, 3' is located along each of the lateral edges 14, 15 of the section 10. The machining devices 3,3' are arranged to move intermittently in the direction of feed of the section and each of them is equipped with at least two cutting torches spaced apart in the direction of movement of the section followed, in the downstream direction, by a planishing mill 4,4' and then by a heat transfer unit 5,5' for each of the lateral edges. Positioned ahead and behind each of the heat transfer units 5,5' is a feeler gauge 6, 7, 6', 7'.

Figure 7:
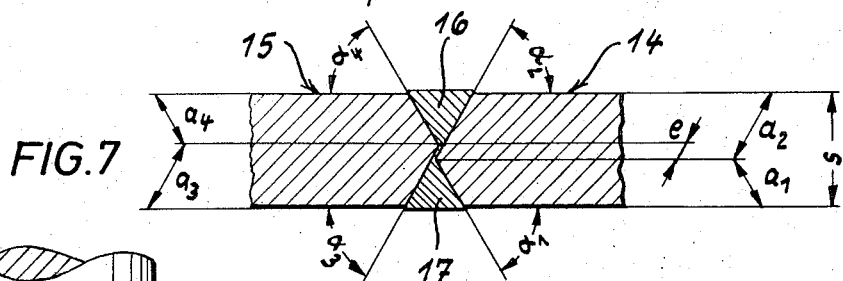
FIG. 7 is a sectional view of two opposite lateral edges welded together.

In the pipe molding machine 24, the lateral edges 14, 15 which have been machined, planished or smoothed, and brought to the proper temperature, are welded to one another at the welding positions $P_1$, $P_2$. An inner arc-welding head 241 which produces the inner welded seam 16, note FIG. 7, is mounted on an inner arm 242 located above the welding position $P_1$. Similarly, an outer arc-welding head 243, which produces the outer welded seam 17, is mounted on an outer arm 244 located above the welding position $P_2$. As the section 10 is deformed from the flat configuration leading to the pipe molding mill into the helical or spiral configuration for forming the welded seam, the spiral pipe string 10a moves along a roller bed of a pipe discharge member 245. A motor 2453 secured on a swing frame 2452 serves to position the pipe discharge member 245 for separating the spiral seam pipe string 10a into individual pipe sections, a pipeseparating device is movably mounted on rails 2461 secured to the fram 2452 of the pipe discharge member 245.

Figure 2:
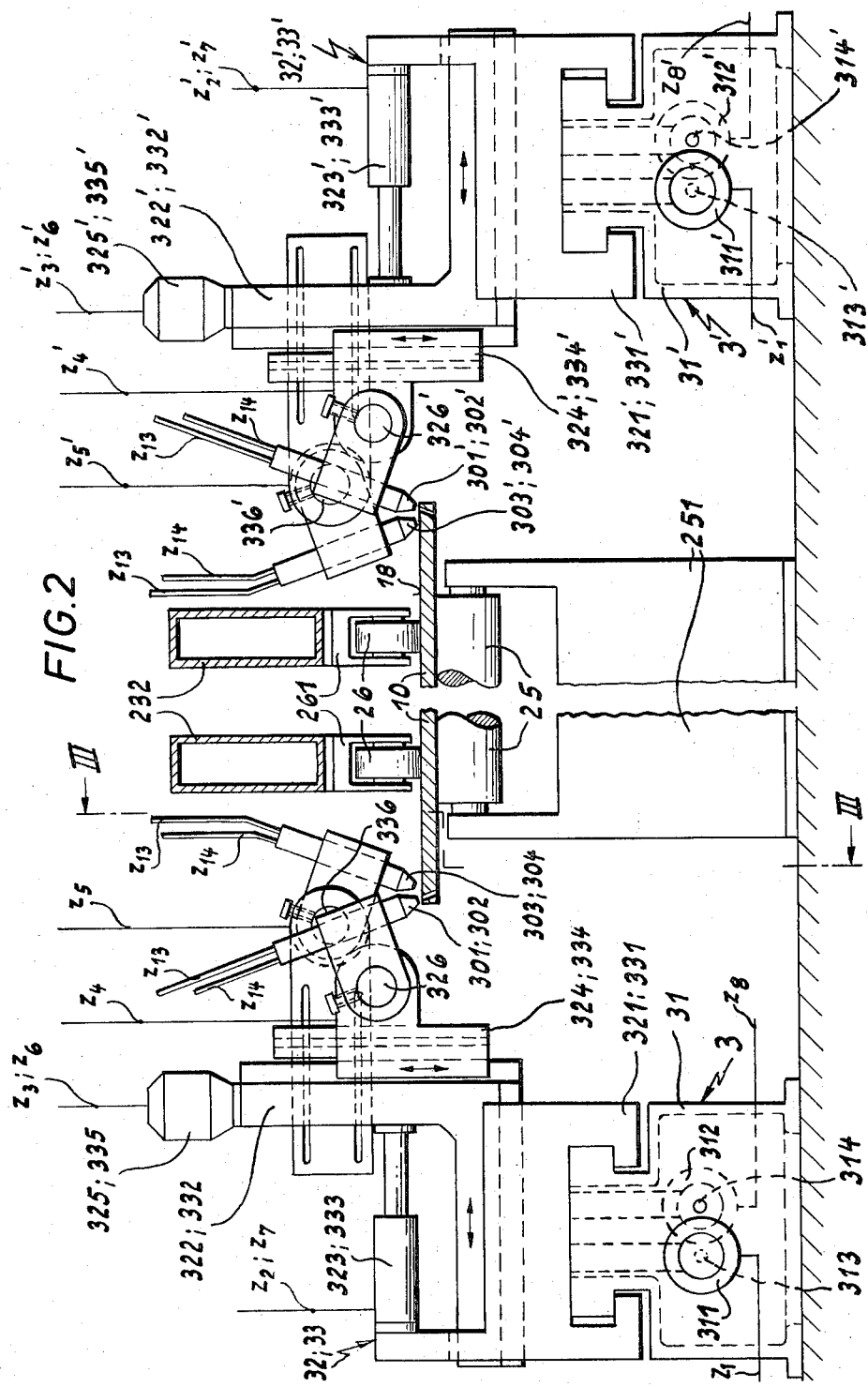
FIG. 2 is an enlarged view taken along the line II—II in FIG. 1 indicating the arrangement of the machining members for trimming the lateral edges of the strip or plate section.
Figure 3:
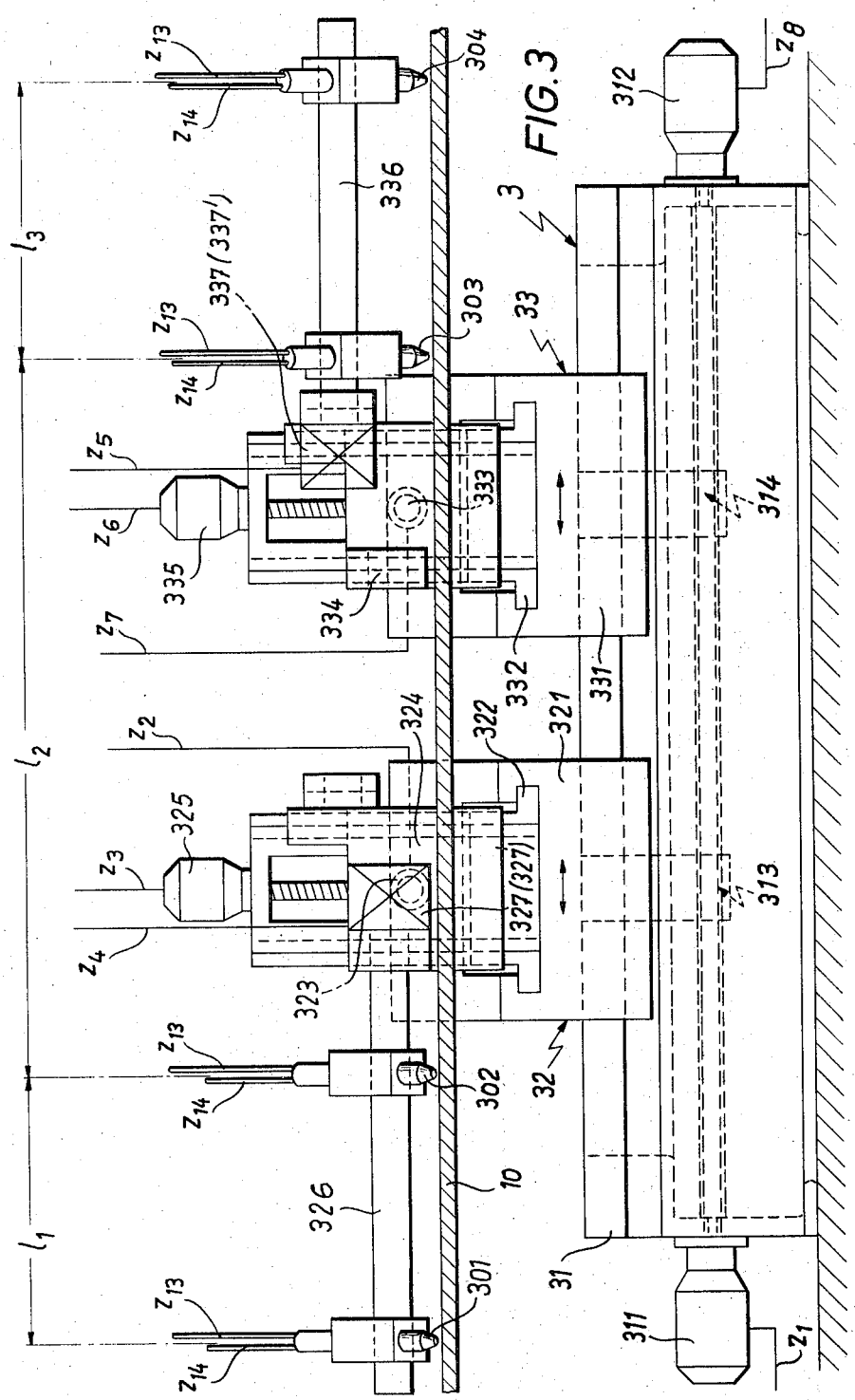
FIG. 3 is a view taken along the line III—III in FIG. 2.
Figure 5:
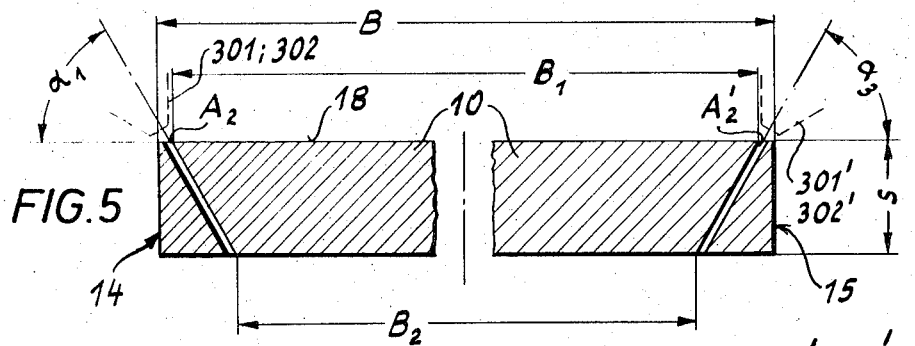
FIG. 5 is an enlarged transverse sectional view of the section indicating the first step of the machining operation.
Figure 6:
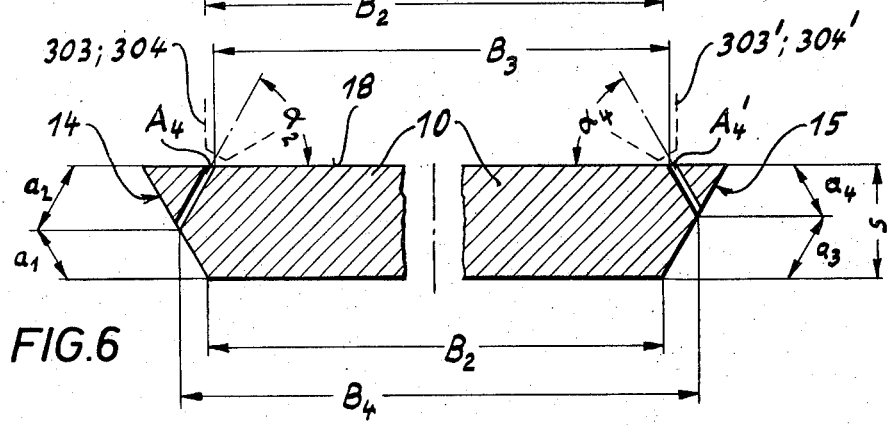
FIG. 6 is another sectional view similar to FIG. 5, but indicating the second machining operation on the section.

As illustrated in FIGS. 2 and 3, each of the trimming devices 3, 3' consists of a machine base 31, 31' and a pair of movable supports 32, 33, 32', 33' for movement longitudinally, transversely and perpendicularly of the section 10. Though two support members 32, 33, 32', 33' are shown on each machine base 31, 31', at least one support member is required for carrying out the operation. Each of the support members carries a pair of cutting torches 301, 302, 303, 304, 301', 302', 303', and 304'. Each support 32, 33, 32', 33' has a carriage 321, 331, 321', 331' which performs a longitudinal movement on the machine base 31, 31' and is driven by a motor 311, 312, 311' and 312' by means of a spindle drive 313, 314, 313', 314'. Mounted on each carriage 321, 331, 321', 331' is a cross slide 322, 332, 322', 332' which can be moved transversely by a shifting motor 323, 333, 323', 333'. On the cross slide 322, 332, 322', 332' , a top slide 324, 334, 324', 334', is guided and it is displaceable in the vertical direction by a shifting motor 325, 335, 325', 335'. A rotatably mounted bar 326, 336, 326', 336' is positioned on the top slide 324, 334, 324', 334' and the cutting torches 301, 302, 303, 304, 301', 302', 303' and 304' are each secured on and offset laterally from the axis of the rotatably mounted bar. The rotary movement of the bar 326, 336, 326', 336', is provided by a motor 327, 337, 327', 337'. On the bars 326, 336, 326', 336', the cutting torches 301, 302, 301', 302' are spaced apart by the distance $l_3$ while the torches 303, 304, 303', and 304' are spaced apart by the distances $l_3$, note FIG. 3. Further, as illustrated in FIGS. 5 to 7, along one lateral edge the cutting torches 301,302 are set at the scarfing angle $\alpha_1$ and the cutting torches 303, 304 are set at the scarfing angle $\alpha_2$. On the opposite lateral edge, the cutting torches 301', 302' are set at the scarfing angle $\alpha_3$ and the cutting torches 303', 304' are set at the scarfing angle $\alpha_4$. As can be seen in FIG. 3, the dimension $l_2$ represents the spacing between the supports 32, 33, 32', 33'.

Figure 4:
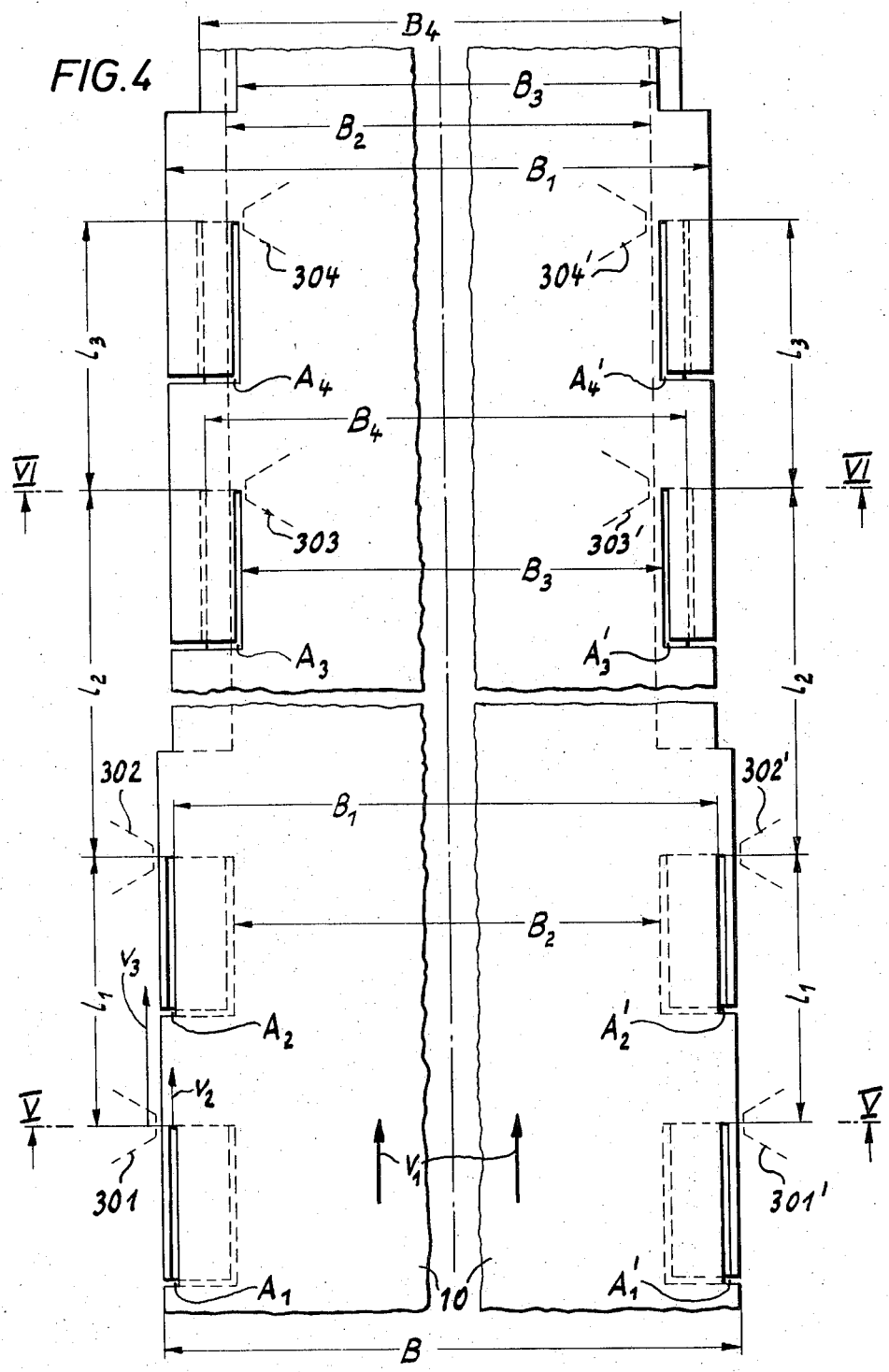
FIG. 4 is a top view of the strip or plate section for forming the spiral seam piping as shown in FIG. 3.

During the machining of the lateral edges 14, 15, the dimension $l_2$ can change constantly, for example, if the velocity of movement in the longitudinal direction of the two supports 32, 33, 32', 33' is different because of the material being machined. As can be seen in the drawing, the lateral edges 14, 15 are both machined downwardly from the top surface 18 of the section 10. At the commencement of the machining operation, the cutting torches 301, 302, 303, 304, 301', 302', 303', 304', positioned initially perpendicularly to the top surface 18, perform a longitudinal movement corresponding to the continuous feed velocity $v_1$ of the section 10, as well as a transverse and pivotal movement, until the respective torches have been positioned in the scrafing angles $\alpha_1, \alpha_2, \alpha_3,$ and $\alpha_4$ at the points $A_1, A_2, A_3, A_4, A_{1'}, A_{2'}, A_{3'}, A_{4'}$, note FIGS. 4, 5 and 6. With the cutting torches positioned as indicated at the points mentioned above, they then move only in the direction of movement of the section 10 toward the pipe molding machine at a velocity $v_3$, which is equal to the continuous feed velocity $v_1$ of the section 10 plus the machining velocity $v_2$ ($v_3 = v_1 + v_2$). As soon as the trimming or machining operation is completed along the longitudinally extending lateral edges of the section 10, the cutting torches are returned to their starting positions so that the machining operation can be repeated. To illustrate the various steps involved in the machining operation, the different widths $B, B_1, B_2, B_3,$ and $B_4$ have been shown in FIGS. 4 to 6. The width $B$, as mentioned above, designates the full width of the section 10 as it is introduced into the machining device 3, 3'. When the first machining step is effected by the cutting torches 301, 302, 301', 302' on the opposite lateral edges of the section 10, the top surface 18 has a width $B_1$ while the lower surface has a width $B_2$. As can be seen in FIG. 5, the initial edge cut tapers inwardly from the top to the bottom surface of the section 10. As the plate 10 passes from the range of the cutting torches 301, 302, 301', 302', to the torches 303, 304, 303', 304', the second cut is effected, however, the scarfing angle is reversed and effects a taper along the lateral edges diverging from the upper surface toward the lower surface. As can be seen in FIG. 6, as the second machining step is carried out, the width $B_3$ of the top surface is further reduced, but since the second cut extends roughly for half of the thickness of the section 10 the width $B_2$ of the lower or bottom surface remains the same. Due to the reversal of the scarfing angles the lateral edges result in a pair of beveled surfaces intersecting at an apex projecting outwardly from each of the edges of the top and bottom surfaces of the section 10. As is clearly indicated in FIGS 6 and 7, the location of the apices extending along the lateral edges are offset relative to one another with respect to the top and bottom surfaces of the section. Accordingly, on one side of the section 10, the lefthand side as viewed in FIG. 6, the bevel formed by the scarfing angle $\alpha_2$ is longer than the remaining portion of the bevel formed by the scarfing angle $\alpha_1$. On the other hand, on the opposite lateral edge the bevel formed by the scarfing angle $\alpha_4$ is shorter than that formed by the remainder of the bevel formed by the scarfing angle $\alpha_3$. Because of the offset relationship of the apices along the lateral edges, an overlapped arrangement is provided when the pipe is spirally wound into position for the welding operation, as indicated in FIG. 7. Due to the offset relationship of the apices, an overlap $e$ is provided when the opposite edges are arranged into the welding position. In carrying out the machining operation, all of the scarfing angles $\alpha_1, \alpha_2, \alpha_3,$ and $\alpha_4$ on the lateral edges 14 and 15 are about equal.

Preferably, the cutting torches are electron beam or plasma torches.

Figure 8:
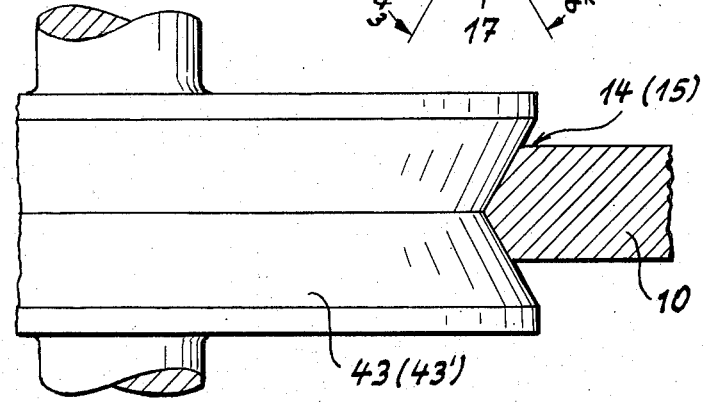
FIG. 8 is a partial view of a planishing roll positioned against one of the lateral edges of the section forming the piping.

On the opposite lateral edges of the section 10, the planishing mills 4, 4' are each composed of a shifting mechanism 41, 41' from which a ram 42, 42' extends with a planishing roll 43, 43' positioned on the free end of the ram. As illustrated in FIG. 8, the planishing roll 43, 43' has beveled surfaces corresponding to the beveled surfaces on the lateral edges of the section 10 for performing a smoothing action.

All of the motors used in the machining devices 3, 3', along with the shifting mechanisms 41, 41' for the planishing mills 4, 4' and the heat transfer units 5, 5' and the feeler gauges 6, 7, 6', 7' are connected to a switching device by means of lines $z_1$ to $z_{12}$ and $z_{1'}$ to $z_{12'}$ and the switching device is, in turn, connected to an electric supply line 9.

During the machining operation, the switching device 8 controls all of the motors in the machining devices 3, 3' in accordance with a predetermined program.

In assuring that the lateral edges are at the proper temperature when they move into the welding positions $P_1, P_2$, the heat transfer units 5, 5' can provide either a heating or cooling effect and the feeler gauges 6, 7, 6', 7', connected to the switching device 8 afford the requisite controlling action in the heat transfer operation.

Preferably, the lateral edges 14, 15 of the section 10 are protected against loss of heat by insulation, not shown, located between the heat transfer units 5, 5' and the welding positions $P_1, P_2$.

In another embodiment of the present invention, the top slide 324, 334, 324', 334' of the supports 32, 33, 32', 33', carry at least two motor-driven milling units, not shown, for trimming the lateral edges 14, 15 of the section 10.

The cutting torches are supplied with elctrical power through the lines $Z_{13}, Z_{14}$.

While a specific embodiment of the invention has been shown and described in detail to illustrate the application of the inventive principles, it will be understood that the invention may be embodied otherwise without departing from such principles.

What is claimed is:

1. Method of preparing the lateral edges of an elongated flat section, such as a metal or plastic strip or plate, provided with or without a cover layer or coating, prior to introducing the section into a spiral seam pipe molding mill where the edges of the section are welded together, comprising the steps of continuously feeding the section to the mill, trimming the edges in the direction in which the section is fed, and finishing the edges before the section is admitted into the mill, wherein the improvement comprises machining each of the lateral edges of the section by moving machining members in the direction of movement of the section at a velocity greater than zero and different from the velocity at which the section is fed, effecting the machining at a first location and a second location spaced downstream in the direction of feed of the section from the first location so that in the first location the lateral edges are partially machined and in the second location the machining of the lateral edges is completed.

2. Method, as set forth in claim 1, wherein following the machining at the second location and prior to introducing the section into the pipe molding mill, smoothing the machined lateral edges of the section.

3. Method, as set forth in claim 2, wherein after smoothing the lateral edges, establishing the temperature of the machined lateral edges at the proper level for carrying out the welding step in the pipe molding machine.

4. Method for preparing the lateral edges of an elongated flat section, such as a metal or plastic strip or plate, prior to introducing the section into a spiral seam pipe molding machine where the edges of the section are welded together, comprising the steps of continuously feeding the section to the mill, trimming the edges in the direction in which the section is fed, and finishing the edges before the section is admitted into the mill, wherein the improvement comprises positioning first machining members along the oppositely disposed, longitudinally extending lateral edges of the section and spacing the first machining members apart in the direction of movement of the section, positioning second machining members along the oppositely disposed, longitudinally extending lateral edges of the section and spacing the second machining members downstream in the direction of movement of the section of the first machining members, as the section is continuously being fed, intermittently moving the first and second machining members in the direction of movement of the section and at a velocity different from the velocity of movement of the section, and after the first machining members have travelled for a predetermined distance in the direction of movement of the section returning the first and second machining members in the opposite direction for repeating the machining cycle, smoothing the machined lateral edges after they have passed downstream from the second machining members and before they have reached the pipe molding machine, and maintaining the temperature of the machined and smoothed lateral edges at the proper temperature level for welding the lateral edges together.

5. Method, as set forth in claim 4, characterized therein by locating the first and second machining members above the surface of the section, positioning the first and second machining members for trimming the lateral edges at an oblique angle to the flat surface of the section with the angle of the first machining member intersecting the angle of the second machining member at a longitudinal line located parallel to and spaced between the flat surfaces extending between the lateral edges, removing a first portion of the lateral edges of the section for the full depth of the section and then removing a second portion of the lateral edges of the section for a portion of the full depth of the section so that the machined lateral edges form an outwardly projecting apex intermediate the upper and lower surfaces of the section.

6. Method, as set forth in claim 5, characterized therein by positioning the first and second machining members along the opposite lateral edges of the section so that the outwardly projecting apices are offset relative to one another whereby an overlapped arrangement of the edges is achieved when the opposite edges are positioned for carrying out the seam welding step.

7. Apparatus for machining the lateral edges of an elongated flat section, such as a metal or plastic strip or plate, provided with or without a cover layer of coating, prior to introducing the section into a spiral seam pipe molding mill where the edges of the section are welded together, comprising means for delivering the section to the pipe molding mill, wherein the improvement comprises at least two machining tools located along each of the longitudinally extending lateral edges of the section, said two machining tools being spaced apart in the longitudinal direction of the section, means for moving said machining tools in the direction of travel of the section toward said pipe molding mill separately from the movement of the section, and means for supporting said machining tools and for positioning tools relative to the lateral edges of the section so that each of said two machining tools trims the lateral edge in a different plane with each plane intersecting the surface of the section at an oblique angle and with the different planes intersecting along a line located parallel to the surface of the section extending between the oppositely disposed lateral edges and spaced between the surfaces of the section.

8. Apparatus, as set forth in claim 7, wherein said means for moving said machining tool includes means for moving said machining tools transversely to the direction of travel of the section.

9. Apparatus, as set forth in claim 8, wherein said means for delivering the flat section to said pipe rolling mill comprises driven rolls spaced from said pipe molding mill upstream in the direction of movement of the section to said pipe molding mill, said two machining tools comprising cutting torches located between said driven rolls and said pipe molding mill, and a planishing mill for each of the lateral edges of the section located between the downstream one of the said torches and said pipe molding mill.

10. Apparatus, as set forth in claim 9, wherein each said cutting torch comprises a base member, a movable support mounted on said base member with said cutting torch mounted on said support, and drive means associated with said support for moving said cutting torch both transversely of and in the direction of movement of the lateral edges and also for moving said cutting tool in the direction perpendicular to the surface of the section extending between the lateral edges thereof.

11. Apparatus, as set forth in claim 10, wherein said support includes a rod rotatably supported therein and supporting said cutting torch with said rod arranged to pivot said cutting torch so that it cuts the section at an oblique angle to the surface thereof extending between the lateral edges.

12. Apparatus, as set forth in claim 11, wherein a motor is operatively connected to said rod for selectively positioning said cutting torch at the desired cutting angle.

13. Apparatus, as set forth in claim 10, wherein said drive means includes a first motor and a second motor operatively associated with said support so that said first motor moves said cutting torch in the direction transverse of the direction of movement of the section and said second motor moves said cutting torch in the direction of movement of the section.

14. Apparatus, as set forth in claim 9, wherein said cutting torches are one of plasma and electron beam cutting torches.

15. Apparatus, as set forth in claim 9, wherein said planishing mill comprises a shifting mechanism, a ram connected to said shifting mechanism and movably displaceable in the direction transverse to the direction of movement of the section, and a planishing roll secured to the end of said ram remote from said shifting mechanism and having its circumferential peripheral surface shaped in the configuration of the machined lateral edges of the section and displaceable into contact with the lateral edges to the medium of said shifting mechanism and said ram.

16. Apparatus, as set forth in claim 10, wherein a switching device is disposed in operative engagement with said driving means for effecting the various movements of said cutting torches.

17. Apparatus, as set forth in claim 7, wherein said machining tool comprises at least two motor-driven milling units for trimming each of the lateral edges of the section.

* * * * *